Nov. 29, 1955 W. DAVIES 2,724,902
DEVICE FOR MEASURING THE PROFILE OF THE
CUTTING SURFACE OF FLUTED CUTTING TOOL
Filed July 30, 1954 3 Sheets-Sheet 3
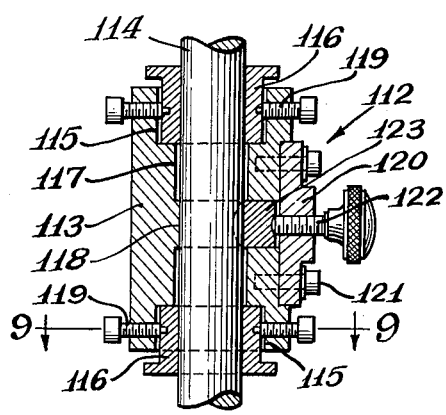
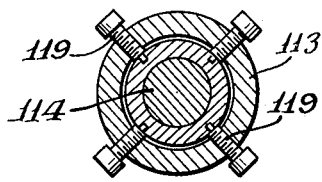
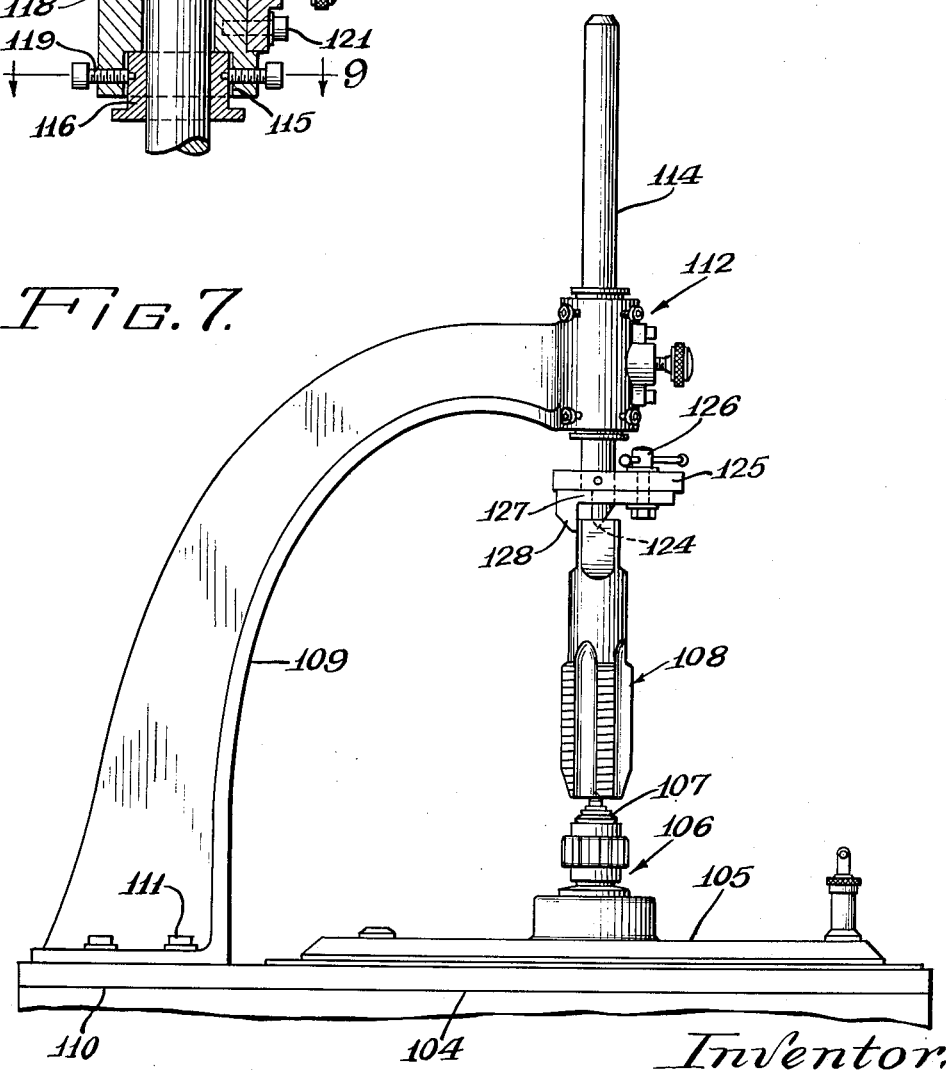
Inventor:
Wayne Davies
By Gary, Desmond & Parker
Attys.

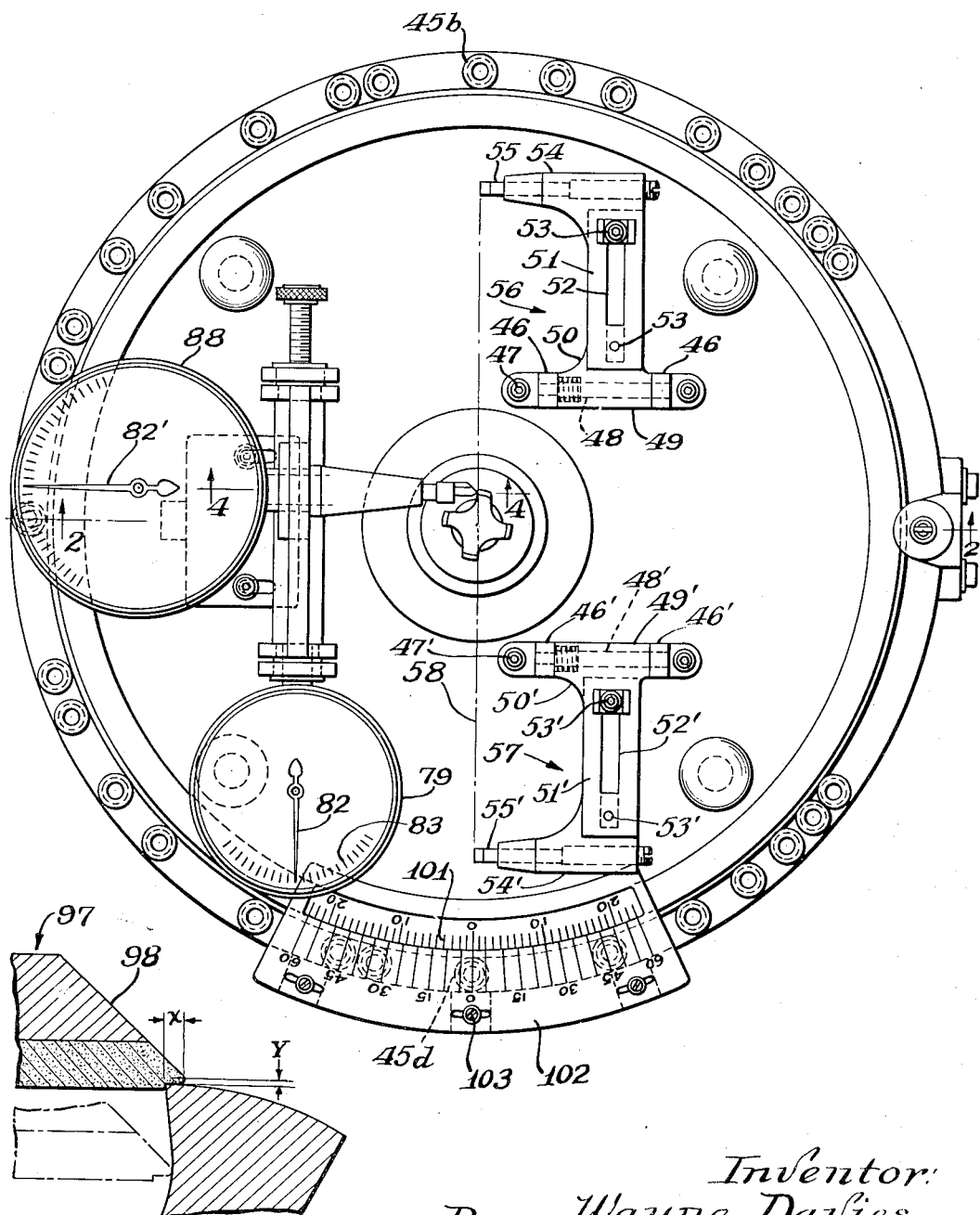

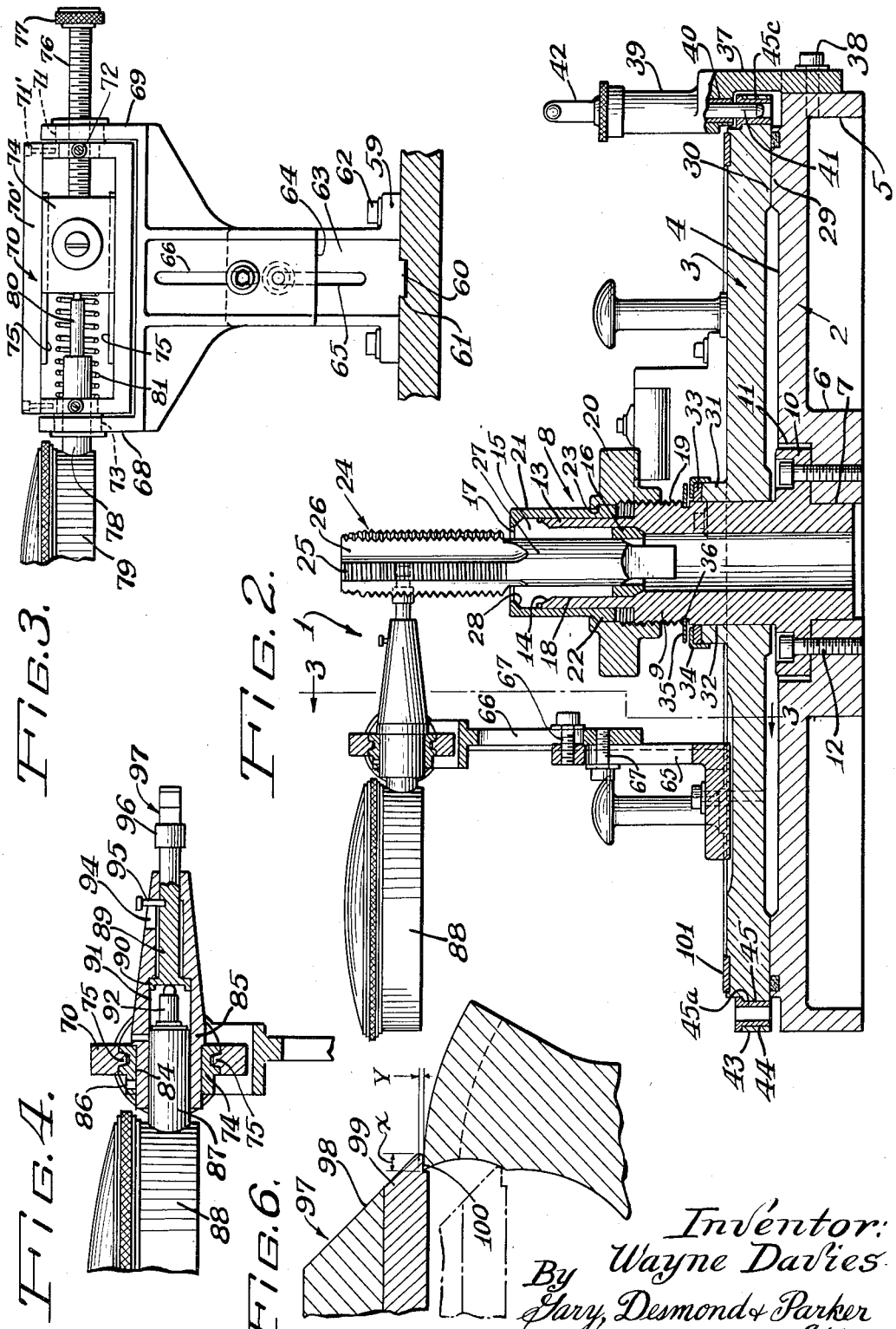

United States Patent Office 2,724,902
Patented Nov. 29, 1955

2,724,902

DEVICE FOR MEASURING THE PROFILE OF THE CUTTING SURFACE OF FLUTED CUTTING TOOL

Wayne Davies, Evanston, Ill.

Application July 30, 1954, Serial No. 446,762

7 Claims. (Cl. 33—201)

This invention relates to improvements in a device for measuring the profile of cutting tools and refers particularly to a device for measuring hook and rake angles or arcs of taps or other fluted cutting tools.

In my copending application for patent, Serial No. 446,761, filed July 30, 1954, a device is described for measuring the index angles of taps or the like, the device including means for properly orienting the tool to be measured and means for effecting the measurement. The present invention relates to a device for securing additional geometric information about simiular cutting tools and the device may be mounted upon and comprise a portion of the same unitary structure as the device comprising the subject matter of my copending application. That is, the two devices may be carried by a common frame structure and the measurements made by the two devices may be secured without removing the tool under test from its original oriented position.

The present device comprises a relatively simple construction for measuring hook arc or rake angle of a fluted cutting tool to an accuracy of one-ten thousandth of an inch or the hook arc or rake angle of a spiral pointed tap may be measured to the same degree of accuracy.

Briefly described the present invention comprises means for profiling a hook or rake angle of a fluted cutting tool thereby securing readings during the profiling operation whereby the actual profile of the cutting tool may be plotted on an enlarged scale.

Other objects, features and advantages of the present invention will be apparent from the accompanying drawings and following detailed description.

In the drawings,

Fig. 1 is a top plan view of the device embodying the present invention.

Fig. 2 is a sectional view taken on line 2—2 of Fig. 1.

Fig. 3 is a sectional view taken on line 3—3 of Fig. 2.

Fig. 4 is an enlarged detailed sectional view taken on line 4—4 of Fig. 1.

Figs. 5 and 6 are greatly enlarged sectional views showing the profiling stylus in contact with different contoured cutting surfaces.

Fig. 7 is an elevational view of a modification of the invention, illustrating a different type of tool-holding mechanism.

Fig. 8 is an enlarged sectional view taken through the centering head of the device shown in Fig. 7.

Fig. 9 is a transverse sectional view taken on line 9—9 of Fig. 8.

Referring in detail to the drawing, 1 indicates generally my improved measuring device which comprises a base 2 and a turntable 3 mounted for rotation upon the base. The base 2 comprises a substantially circular platform 4 which carries at its outer periphery a downwardly extending annular supporting flange 5. Adjacent the central portion of the platform 4 a downwardly extending boss 6 is carried, said boss being provided with a central aperture 7.

A chuck 8 is rigidly mounted upon base 2, said chuck comprising a tubular member 9, the lower portion of which is adapted to be positioned in the aperture 7 in the base. The tubular member carries an integral outwardly extending flange 10 which is positioned in a circular recess 11 provided in the upper face of the base 2. A plurality of screws 12 are carried by the flange 10 and are adapted to make threaded engagement with the boss 6 of base 2 whereby the chuck may be rigidly secured to the base and extend vertically therefrom.

The upper portion of the tubular member 9 terminates in a relatively thin wall annular tube 13, the upper edge portions of which are chamfered inwardly, as indicated at 14 in Fig. 2. A collet 15 is adapted to be positioned within the relatively thin walled portion of the tube 9, said collet having an annular lower portion 16 and an upper portion 17 which is provided with a plurality of longitudinal slots 18.

The external portion of the tubular member 9 carries screw threads 19 with which a lock nut 20 is adapted to engage. A retaining member 21 circumscribes the upper portion of the tubular walls 13 and at its lower portion carries an outwardly extending annular flange 22 which is engageable by an overhanging shoulder 23 of the lock nut 20.

In operation, a tap 24 is adapted to be positioned in the tubular member 9, the tap having threaded portions 25 and longitudinal flutes 26 which space the lands circumferentially from each other. The lower portion of the tap 24 comprises a substantially cylindrical shank 27 which is positionable within the chuck 8. The shank 27 is disposed within the split collet 15 and the nut 20 is manipulated to draw the retaining member 21 downwardly against the upper portion of the split collet, the retaining member having an inwardly extending annular shoulder 28 which bears upon the upper portion of the split collet 15. In urging the collet downwardly, the collet engages the tapered or chamfered shoulder 14 and thus the split collet is urged radially inwardly with respect to the shank 27 thereby firmly gripping said shank which is maintained substantially coaxial with respect to the tubular member 9. In this fashion, the tap 24 is disposed in position whereby the desired angular measurements may be made thereon.

As has been hereinbefore described, the turntable 3 is rotatable with respect to the base 2. The platform 4 of the base 2 carries an upwardly extending annular bearing portion 29 upon which a downwardly extending annular bearing portion 30 formed upon the lower face of the turntable 3 is adapted to rest. In this fashion the turntable 3 is supported for rotation upon the base 2, the bearing portions 29 and 30 being slidably related to each other.

The central portion of the turntable 3 carries an upwardly extending boss 31 and the central portion of the turntable, including the boss 31, is provided with a central aperture 32 through which the tubular member 9 extends. An annular dust seal 33 which may comprise a felt washer or the like is positioned upon the upper portion of the boss 31 and is retained in position thereon by collar 34. A retaining ring 35 is positioned in an annular groove 36 provided in the exterior wall of the tubular member 9, said ring functioning to prevent unintended axial movement of the turntable 3 with respect to the tubular member 9.

A bracket 37 is secured by means of screws 38 to flange 5 of the base 2. The bracket 37 carries an upwardly extending cylindrical member 39. A tubular sleeve 40 is positioned within the cylindrical member 39 and an indexing pin 41 is slidably positioned within the tubular sleeve 40. The indexing pin 41 is connected to a control handle 42 whereby said pin may be raised or lowered within the sleeve 40. A coil spring (not shown)

is positioned within the cylindrical member 39 and bears upon the upper end of the indexing pin 41 whereby said indexing pin is normally urged downwardly.

The turntable 3 adjacent its periphery carries a relatively depressed annular portion 43. The annular portion 43 is provided with a plurality of apertures 44 and in each aperture a tubular sleeve bushing 45 is positioned. As will be hereinafter more fully described, the bushings 45 being constructed of hardened steel, are employed in conjunction with the indexing pin 41, to index properly the turntable 3 with respect to the base 2. The depressed portion 43 of the turntable 3 is positioned immediately beneath the tubular member 40 and by the proper manipulation of the turntable 2 said turntable can be so manipulated as to dispose an aperture defined by a bushing 45 in coaxial relationship with respect to the indexing pin 41. A plurality of apertured bushings 45 are disposed in desired circumferential relationship around the entire periphery of the turntable whereby said turntable may be locked in predetermined angular positions relative to the base 2.

A pair of standards 46 are mounted in spaced relationship upon the turntable 3, said standards being secured to the turntable by means of screws 47 or the like. A shaft 48 is rigidly secured to the standards 46 and a sleeve 49 is rotatably positioned upon said shaft. The sleeve 49 carries an arm 50 which is provided with an elongated aperture and a second arm 51 is adapted to overlie the arm 50, said second arm also being provided with a similar elongated aperture 52. A pair of clamps 53 are employed to lock the arms in a fixed relationship to each other, that is, the arms are relatively extensible and may be locked together at a desired degree of extensibility. The arm 51 carries a sleeve 54 at its outer end which, in turn, is adapted to receive an alignment pin 55 which is threadedly and adjustably positioned therein. The device hereinbefore described will hereinafter be referred to as the "right-hand alignment device 56."

A similar alignment device 57 is also mounted upon the turntable 3 opposite the right-hand alignment device 56 and the device 57 is identical with the device 56. Without further description of the parts, primed reference numerals will be applied to the device 57 corresponding to similar parts of the device 56. The device 57 will hereinafter be referred to as the "left-hand alignment device 57."

The alignment devices 56 and 57 are adapted to align properly the tap 24 in the chuck 8 whereby said tap will bear a fixed relationship to both the base 2 and turntable 3 and the parts fixedly secured thereto.

To employ the devices 56 and 57, a test block (not shown) may be positioned in the chuck 8 and the ends of the pins 55 and 55' may be aligned with said block in such manner that the ends of said pins lie on a diametral line which is adapted, when the tap is positioned in the chuck 8, to intersect the axis of the tap.

It is to be understood, however, that other suitable and conventional means may be employed to align the tap since the operation of my present invention assumes the proper alignment of the tap as a prerequisite. In my copending application hereinbefore identified, a suitable means for aligning the tap is described employing alignment devices similar to the devices 56 and 57.

The present device is adapted to measure the hook angles and rake angles of either right- or left-handed taps. In the event that a right-handed tap is to be measured, such as the tap 24, the left-hand alignment device 57 will be used to align the tap. If a left-handed tap is to be aligned, the right-hand alignment device 56 will be used to align the tap. To align properly the tap, the shank of the tap is positioned in the chuck 8 and the lock nut is tightened to a degree which will permit movement of the tap within the chuck. Depending upon the length of the tap the arms 51' and 50' may be disposed in extended or contracted relationship with respect to each other and the clamps 53' may be locked. The arms may then be swung about the pin 48' until the end of the alignment pin 55' is disposed adjacent the leading edge or cutting edge of the tap. The tap is then rotated to bring said leading edge or cutting edge into contiguous relationship with the end of the alignment pin 55'. When the tap has been brought to this position the lock nut 20 is manipulated to securely lock the tap in place. The alignment arms comprising the device 57 may then be swung to inoperative position as illustrated in Fig. 1.

A block 59 is positioned upon the turntable 3, the lower portion thereof carrying a rib 60 (Fig. 3) which slidably engages in a guide slot 61 provided in the face of the turntable, the guide slot being radially disposed whereby block 59 may be moved toward or away from chuck 8. By means of screws or bolts 62 the block 59 may be locked in a desired position relative to the chuck. An upright member or standard 63 is carried by the block 59 with which a supporting bracket 64 slidably engages, both the standard 63 and bracket 64 being provided with elongated slots 65 and 66, respectively, for the reception of clamping screws 67 whereby the bracket may be locked at a predetermined height with respect to the standard 63.

The upper portion of the bracket 64 terminates in yoke arms 68 and 69 between which is carried a rectangular trunnion frame 70. An internally threaded bushing 71 is carried in apertures provided in arm 69 and an end member of frame 70, said bushing being rigidly secured to end member of said frame by set screw 72. A bushing 73 is journaled in arm 68 and is rigidly carried in an adjacent end member of frame 70. A gauge-supporting block 74 is positioned within guide frame 70 and is slidably positioned upon guide ribs 75 carried by the longitudinal members of frame 70. One side 70' of the trunnion frame 70 is secured to the end members of said frame by screws 71', and for properly spacing ribs 75 from each other, shims (not shown) may be carried between the ends of the end members of frame 70 and the end portions of the side 70'.

A screw 76 is threadedly engaged in bushing 71, said screw having a knurled manipulating knob 77 at one end and being rotatably but inseparably secured to block 74 at the other end. A tubular stem 78 is rigidly carried in bushing 73, said stem comprising a part of the frame of a conventional indicator 79. The actuating arm 80 of the indicator 79 is slidably positioned in stem 78 and bears, at its outer end, upon the guide block 74. A coil spring 81 embraces the stem 78 within frame 70 and also embraces the actuating arm 80, said spring bearing upon guide block 74 and urging said block toward screw 76.

As has been hereinbefore described, the indicator 79 is of conventional construction and per se comprises no part of my invention. The indicator is provided with the usual needle or pointer 82 which moves over a calibrated scale 83. The calibrations 83 are conveniently in thousandths of an inch.

The guide block 74 is provided with a central aperture 84 in which a guide sleeve 85 is positioned, being rigidly secured therein by set screw 86. A tubular stem 87 of a second conventional indicator gauge 88 is rigidly positioned in one end of the guide sleeve 85. A stylus holder 89 is slidably positioned in the opposite end of the sleeve 85, the inner end of said holder carrying a flange 90 which is positioned in a recess 91 provided in the guide sleeve. The actuating arm 92 of the indicator 88 extends into the recess 91 and its end is adapted to be contiguous with the flanged end of the stylus holder 89.

In the conventional indicator, the actuating arm when in extended position is operative to move needle 82'. However, the actuating arm may, when desired, be retracted to an inoperative position. When in operative position the actuating arm 92 bears upon the stylus holder 89. When inoperative the actuating arm is withdrawn from said holder. When in this position the stylus holder may be independently withdrawn. To permit this operation a slot is provided in the wall of the sleeve 85 and a screw 95, carried by the stylus holder projects through said slot whereby means is provided for retracting the stylus holder. The screw 95 also prevents rotation of the stylus holder.

A collar 96 is carried at the end of the stylus holder 89 and a stylus 97 is removably fastened in said collar. The stylus 97 has a tapered end, as shown best in Figs. 5 and 6, at 98. A hardened steel point 99 is carried at the end of the stylus and adjacent the tip of the stylus said tip is provided with an offset portion 100. The function of the offset portion 100 will be hereinafter more fully described.

The frame 70 is positioned parallel to the line 58 and the stem 87, sleeve 85 and stylus holder 89 are positioned at right-angles to said frame and, hence at right-angles to line 58. The block 74 is slidably movable upon frame 70 and, hence, the stylus is movable parallel to line 58. In addition, the stylus is movable toward and away from the indicator 88. Accordingly, the stylus is movable in two coordinate directions, and it is this movement which permits the profiling and measuring of the hook and rake angles of the tap 24.

In utilizing the present invention, depending upon the number of flutes of the tap, the measurements of the hook or rake angles may be taken at any desired position if the index angles of the tap are theoretically correct. For instance, if a four flute tap is to be measured, the measurements can be taken at four positions of the turntable 3. Preferably the measurements are commenced with the pin 41 in bushing 45a, Fig. 2. The second measurement would preferably be taken with pin 41 in bushing 45b, Fig. 1. The third measurement may be taken with pin 41 in bushing 45c and the fourth measurement may be taken with the pin 41 in bushing 45d. The mechanism for measuring the hook or rake angle is illustrated in Figs. 1 and 2 as being in the third position, that is, with the pin 41 in the bushing 45c.

In taking the measurements, the indicator 88 is disposed in a substantially horizontal plane parallel to the turntable 3. The screw 76 is manipulated to dispose the end of the stylus 97 adjacent the tap 24. The end of the stylus may then be disposed in a substantially central portion of the arc of the leading edge of the land of the tap as shown in broken lines in Figs. 5 and 6. The screw 76 may then be manipulated to move the stylus toward the cutting edge of the land, that is, the stylus would be moved upwardly as viewed in Fig. 1, the end of the stylus moving along the arc of the cutting surface of the land.

The notch at the end portion of the stylus has two predetermined fixed dimensions. For instance, the dimension x may be .020 inch and the dimension y may be .005 inch. The stylus is so moved by the screw 76 as to bring the cutting edge of the tap into the notch 100, as illustrated in Figs. 5 and 6. In this position the pointed end of the stylus which may have a radius of curvature of .001 inch will be moved inwardly from the cutting edge of the tap a distance equal to the distance x and the pointed end of the stylus will be moved laterally a distance approximately equal to the distance y. With the stylus in this position the needle of gauge 88 may be set to a position offset from the zero marking of the gauge a distance equal to .020 inch and the needle of the gauge 79 may be set to a position offset from the zero marking of said gauge a distance equal to .010 inch. Thus, when the point of the stylus is brought into the cutting edge of the tap both gauges will read zero.

With the stylus point in contact with the cutting edge of the tap the screw 76 may then be moved in desired increments as measured by the gauge 79 and readings of the needle upon gauge 88 for each incremental movement may be observed. For instance, the screw 76 may move the stylus in increments as measured on gauge 79 of .001 inch. With each incremental movement of .001 inch upon gauge 79 the reading of gauge 88 may be noted. It will be observed that as the screw 76 is manipulated, the block 74 and hence the stylus 97 moves along the arc of the cutting surface of the tap, that is, the stylus traces the arc and the coordinate movements of the stylus will be noted upon gauges 79 and 88. From the readings upon these gauges the arc of the cutting surface of the tap may be plotted.

Of course, the cutting surfaces of the tap are not necessarily arcuate. In the art, where the cutting edge of the tap overhangs the cutting surface the measurement is referred to as the measurement of a hook angle. Where the cutting surface falls along a radial line drawn from the cutting edge of the tap to the axis of the tap the measurement is referred to as the measurement of a zero rake angle. In some taps the cutting surface is in advance of the cutting edge of the tap considered in the direction of rotation of the tap during its use. A measurement of this angle is referred to as the rake angle but in this case the rake angle will be positive. In the present device although the measurements taken are actually linear measurements, being the coordinates of the movement of the point of the stylus, such coordinates when plotted upon suitable graph paper will indicate the measurements known in the art as the hook or rake angles of the tap.

Of course, it is to be undestood that the turntable may be swung to the positions hereinbefore described and all of the cutting surfaces of the tap may be measured. Where a two flute tap having theoretically correct index angles is measured, the pin 41 will be initially positioned in the bushing 45a for one reading and will be positioned in bushing 45c for the next reading. Other bushings are provided along the depressed portion 43 of the turntable whereby the gauge mechanism may be positioned to measure three flute taps, five flute taps, six flute taps, seven flute taps, up to ten flute taps. However, in all cases the procedure in measuring the hook or rake angles is the same as hereinbefore described.

It will be noted that when the stylus 97 is positioned as shown in full lines in Figs. 5 and 6, the needle 82 of the gauge 79 is offset .001 inch from the zero position. The reason for so offsetting the needle 82 is to compensate for the radius of curvature of the stylus point which is of a radius of .001 inch. Consequently, when the central portion of the arcuate point rests upon the cutting edge of the tap, the stylus will have moved inwardly toward the tap cutting surface a distance equal to .001 inch. Of course, the geometric measurements herein set forth are for purposes of example only. For instance, the measurements x and y may depart from the specific figures given. However, in all cases the measurement y will be correlated with the radius of curvature of the stylus point so that the gauge 79 may always be properly set to indicate that the stylus point rests upon the cutting edge of the tap.

In my copending application for patent hereinbefore identified, it is pointed out that although the flutes and lands of, for instance, a four-flute tap are theoretically 90° apart, it frequently happens that the cutting surfaces of the lands vary from the theoretical 90° position. Hence, when determining the hook or rake angle of a tap which has been found to have index angles which vary from the theoretical, the only hook or rake angle which can be properly measured by orienting the turntable 3 with the base by the use of the indexing pin 41, is the measurement taken in the first position, that is, where the pin 41 engages the bushing 45a. The remaining three quadrant positions, that is, with pin 41 in bushing 45b, 45c and 45d will be incorrect since the presupposed index angles vary from the ideal.

Ordinarily, the measurement of only one hook or rake angle is necessary since the hook or rake angles seldom vary in a predetermined tap from land to land even though the index angles may depart from the theoretical. However, to measure the hook or rake angles of all land cutting surfaces when it is known that the index angles vary from the theoretical, the following procedure may be employed.

A protractor scale 101 is carried upon the peripheral portion of the turntable 3 and a vernier scale 102 is secured by means of screws 103 to a peripheral portion of the base 2. When pin 41 is in engagement with bushing 45a the zero mark of the vernier will be in alignment with the zero mark of the protractor and both will be in alignment with the line 58.

Hence, when the index angles of the tap are determined, it may be found that the second land measured, in for instance a four-flute tap, varies from the first land measured by an angle greater or lesser than 90° as indicated upon the vernier 102. Hence, if the hook or rake angle of the second land were to be measured, the turntable would be positioned so that the protractor and vernier indicate this variation. With the turntable in this position, the hook or rake angle of the tap may be measured, as hereinbefore described. The same procedure may be followed in making the third and fourth measurements instead of indexing the turntable with pin 41 in bushings 45b, 45c and 45d as would be done if the index angles were found to be accurate.

Referring particularly to Figs. 7, 8 and 9 a modification of the invention is illustrated, the modification being directed essentially to the means for holding the tap while the measurements, hereinbefore described, are taken.

The reference numeral 104 indicates a stationary base, similar to base 2, and a turntable 105 is rotatably positioned upon the base 104, the turntable being similar to turntable 3 and carrying the various testing devices, hereinbefore described. For clarity in illustration, however, the various testing devices are not shown in Fig. 7. A chuck 106 is carried by the base 104 and extends upwardly through the central portion of the turntable 105. The chuck 106 is adapted to carry a centering device 107 which is adapted to fit into the conical female opening provided in the end of tap 108, that is, the opening usually provided in the tap when the tap is manufactured. In relatively small diameter taps a male point is carried by the tap and, hence, if a relatively small tap is being tested upon the device, the member 107 will comprise a female member to register with the male point.

An arcuate supporting arm 109 is mounted upon a radial extension 110 of the base 104 and is secured thereto by means of screws or the like 111. The opposite end of the arm 109 is positioned above the central portion of the turntable and comprises a centering head 112. The centering head 112 comprises a sleeve portion 113 which may, if desired, be formed integral with the arm 109. A centering rod 114 is adapted to be positioned in the sleeve portion 113 and is adapted to be locked therein, as will be hereinafter more fully described.

The sleeve portion 113 is provided with relatively enlarged bores 115 at each end in which laterally movable centering sleeves 116 are positioned, said sleeves embracing the centering rod 114. The outer diameter of the sleeves 116 is slightly smaller than the inner diameter of the bores 115 and, hence, the sleeves, with the shaft 114, may be moved laterally within the bores. Sleeve portion 113 is provided with relatively restricted central bores 117, the inner diameter of which is slightly larger than the outer diameter of the centering rod whereby a degree of lateral freedom of movement is provided for said rod. An annular rib 118 is formed at the central portion of the bore 117 whereby the rib and centering rod fit relatively snugly.

The arrangement is such that the rod 114 may be canted about the rib 118 as a fulcrum, and thus rod 114 may have its axis inclined to the vertical at a relatively small angle, if desired. To adjust the rod within the sleeve 4 set screws 119 are threadedly positioned in the walls of the sleeve defining bores 115, the dog points of the set screw being received in sleeves 116. Hence, by the proper manipulation of the set screws 119 the rod 114 may be canted to a desired position about rib 118.

A plate 120 is secured to the outside surface of the head 112 by means of screws 121 or the like and a locking screw 122 may be threadedly positioned through said plate. A locking block 123 is engaged by the end of screw 122 and, hence, after the rod 114 has been properly adjusted by the set screws 119, the rod may be locked in adjusted position by screw 122.

The lower end of the centering rod 114 may be formed with a conical tip 124 which is adapted to engage in the conical recess normally provided in the tap 108. A plate 125 is secured to the end portion of the rod 114 and carries a capstan screw 126. A second plate 127 is slidably related to plate 125 and may be fastened to said latter plate in a desired position by the capstan screw which passes through a slot provided in plate 127. The plate 127, at one end, carries a nose 128 which is adapted to contiguously engage the square surface of the shank of the tap 108. Thus, the shank of tap 108 is confined between nose 128 and point 124 and may be moved when rod 114 is moved, as has been hereinbefore described.

If the tap is of the type having centering points instead of the usual conical recesses in the ends thereof, the end of rod 114 may be provided with a female centering recess instead of the male point 124.

The modification of the invention illustrated in Figs. 7, 8 and 9 is particularly adaptable for centering and holding relatively large taps while they are being measured, as hereinbefore described.

However, if desired, the device shown in Figs. 7, 8 and 9 may be employed to all sizes of taps thus completely replacing the chuck 8.

Of course, it is to be understood that the device comprising the present invention is not to be limited to the specific uses thereof hereinbefore described. Such uses have merely been set forth for purposes of illustrating and exemplifying the operation. Hence, the invention is not to be limited except as necessitated by the appended claims.

I claim as my invention:

1. A device for measuring the profile of the cutting surface of a fluted cutting tool in a plane at substantially right-angles to the axis of the tool which comprises, a base, a turntable rotatably positioned upon said base, means for holding a fluted cutting tool carried by said base, a support carried by said turntable, a block slidably carried by said support for movement laterally of said holding means and cutting tool, an indicator carried by said support and responsive to movement of said block, a second indicator carried by said block, a stylus carried by said second indicator and movable toward and away from said second indicator to actuate said second indicator, said stylus being adapted to be disposed in contact with the cutting surface of the tool carried by the holding means whereby coordinate movements of said stylus in a plane at substantially right-angles to the axis of the tool are indicated upon said indicators.

2. A device for measuring the profile of the cutting surface of a fluted cutting tool in a plane at substantially right-angles to the axis of the tool which comprises, a base, a turntable rotatably positioned upon said base, means for holding a fluted cutting tool carried by said base, a support carried by said turntable and movable toward and away from said holding means and cutting tool, a block slidably carried by said support for movement laterally of said holding means and cutting tool, an indicator carried by said support and responsive to movement of said block, a second indicator carried by said block, a stylus carried by said second indicator and movable toward and away from said second indicator to actuate said second indicator, said stylus being adapted to be disposed in contact with the cutting surface of the tool carried by the holding means whereby coordinate movements of said stylus in a plane at substantially right-angles to the axis of the tool are indicated upon said indicators.

3. A device for measuring the profile of the cutting surface of a fluted cutting tool in a plane at substantially right-angles to the axis of the tool which comprises, a base, a turntable rotatably positioned upon said base, a chuck for holding a fluted cutting tool carried by said base, a support carried by said turntable, a frame swingably mounted on said support, a block slidably carried by said frame for movement laterally of said held cutting tool, an indicator carried by said support and responsive to movement of said block, a second indicator carried by said block, a stylus carried by said second indicator and movable toward and away from said second indicator to actuate said second indicator, said stylus being adapted to be disposed in contact with the cutting surface of the tool carried by the chuck whereby coordinate movements of said stylus in a plane at substantially right-angles to the axis of the tool are indicated upon said indicators.

4. A device for measuring the profile of the cutting surface of a fluted cutting tool in a plane at substantially right-angles to the axis of the tool which comprises, a base, a turntable rotatably positioned upon said base, a chuck for holding a fluted cutting tool with its axis substantially vertically carried by said base, a support carried by said turntable, a block slidably carried by said support for movement laterally of said cutting tool, an indicator carried by said support and responsive to movement of said block, a second indicator carried by said block, a stylus carried by said second indicator and movable toward and away from said second indicator to actuate said second indicator, said stylus being provided with a notched end for cooperation with the cutting edge of said tool to establish a datum position for said indicator, said stylus being adapted to be moved in contact with the cutting surface of the tool carried by the chuck from the cutting edge thereof toward its axis whereby coordinate movements of said stylus in a plane at substantially right-angles to the axis of the tool are indicated upon said indicators.

5. A device for measuring the profile of the cutting surface of a fluted cutting tool at substantially right-angles to the axis of the tool which comprises, a base, a turntable rotatably positioned upon said base, a chuck for holding a fluted cutting tool carried by said base and projecting upwardly through the center of said turntable, a support carried by said turntable, a block slidably carried by said support for movement laterally of said chuck and cutting tool, an indicator carried by said support and responsive to movement of said block, a second indicator carried by said block, a stylus carried by said second indicator and movable toward and away from said second indicator to actuate said second indicator, said stylus being adapted to be disposed in contact with the cutting surface of the tool carried by the chuck whereby coordinate movements of said stylus in a plane at substantially right-angles to the axis of the tool are indicated upon said indicators.

6. A device for measuring the profile of the cutting surface of a fluted cutting tool at substantially right-angles to the axis of the tool which comprises, a base, a turntable rotatably positioned upon said base, a chuck for holding a fluted cutting tool carried by said base and projecting upwardly through the center of said turntable, a support carried by said turntable, a block slidably carried by said support for movement laterally of said chuck and cutting tool, an indicator carried by said support and responsive to movement of said block, a second indicator carried by said block, a stylus carried by said second indicator and movable toward and away from said second indicator to actuate said second indicator, said stylus being adapted to be disposed in contact with the cutting surface of the tool carried by the chuck whereby coordinate movements of said stylus in a plane at substantially right-angles to the axis of the tool are indicated upon said indicators, and means for locking said turntable at predetermined positions relative to said base to dispose said indicators at predetermined positions relative to said chuck and cutting tool.

6. A device for measuring the profile of the cutting surface of a fluted cutting tool at substantially right-angles to the axis of the tool which comprises, a base, a turntable rotatably positioned upon said base, a chuck for holding a fluted cutting tool carried by said base and projecting upwardly through the center of said turntable, a support carried by said turntable, a block slidably carried by said support for movement laterally of said chuck and cutting tool, an indicator carried by said support and responsive to movement of said block, a sleeve carried by said block, a stylus holder axially movable in said sleeve, a stylus carried by said stylus holder, a second indicator carried by said block, an actuating arm carried by said second indicator in contact with said stylus holder whereby said second indicator is responsive to movement of said stylus, said stylus being adapted to be disposed in contact with the cutting surface of the fluted tool carried by the chuck whereby coordinate movements of the stylus in a plane at substantially right-angles to the axis of the tool are indicated upon said indicators.

7. A device for measuring the profile of the cutting surface of a fluted cutting tool at substantially right-angles to the axis of the tool which comprises, a base, a turntable rotatably positioned upon said base, a chuck for holding a fluted cutting tool carried by said base and projecting upwardly through the center of said turntable, a support carried by said turntable, a frame swingably mounted on said support, a block slidably carried by said frame for movement laterally of said chuck and cutting tool, means for moving said block in said frame, an indicator carried by said support and responsive to movement of said block, a second indicator carried by said block, a stylus carried by said second indicator and movable toward and away from said second indicator to actuate said indicator, said stylus being adapted to be disposed in contact with the cutting surface of the tool carried by the chuck whereby coordinate movements of said stylus in a plane at substantially right-angles to the axis of the tool are indicated upon said indicators.

No references cited.